(12) United States Patent
Kim et al.

(10) Patent No.: US 8,339,481 B2
(45) Date of Patent: Dec. 25, 2012

(54) IMAGE RESTORATION DEVICES ADAPTED TO REMOVE ARTIFACTS FROM A RESTORED IMAGE AND ASSOCIATED IMAGE RESTORATION METHODS

(75) Inventors: Tae-chan Kim, yongin-si (KR); Joon-ki Paik, Seoul (KR); Sang-hoon Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 357 days.

(21) Appl. No.: 12/654,217

(22) Filed: Dec. 14, 2009

(65) Prior Publication Data
US 2011/0141322 A1    Jun. 16, 2011

(51) Int. Cl.
*H04N 5/217* (2011.01)
(52) U.S. Cl. .................................................. 348/241
(58) Field of Classification Search ............... 348/222.1, 348/231.99, 231.2, 231.6, 260, 261, 262, 348/263, 264, 265, 241
See application file for complete search history.

(56) References Cited

U.S. PATENT DOCUMENTS

| | | | | |
|---|---|---|---|---|
| 6,067,125 | A * | 5/2000 | May | 348/607 |
| 6,897,983 | B1 * | 5/2005 | Kawano | 358/3.26 |
| 7,061,693 | B2 | 6/2006 | Zalevsky | |
| 7,064,868 | B2 * | 6/2006 | Kawano | 358/2.1 |
| 7,145,607 | B1 * | 12/2006 | Hui | 348/607 |
| 7,256,818 | B2 * | 8/2007 | Sadok et al. | 348/143 |
| 7,365,917 | B2 | 4/2008 | Zalevsky | |
| 7,418,149 | B2 * | 8/2008 | Dinh et al. | 382/254 |
| 7,548,278 | B2 * | 6/2009 | Shin et al. | 348/607 |
| 2004/0061777 | A1 * | 4/2004 | Sadok | 348/83 |
| 2006/0198623 | A1 | 9/2006 | Ono | |
| 2006/0285020 | A1 * | 12/2006 | Shin et al. | 348/701 |
| 2008/0080028 | A1 | 4/2008 | Bakin et al. | |
| 2009/0002562 | A1 * | 1/2009 | Yokoyama et al. | 348/673 |
| 2009/0299184 | A1 * | 12/2009 | Walker et al. | 600/447 |

FOREIGN PATENT DOCUMENTS

| | | |
|---|---|---|
| JP | 2006-279940 A | 10/2006 |
| JP | 2008-058803 A | 3/2008 |
| KR | 10-2007-0073745 A | 7/2007 |

OTHER PUBLICATIONS

Originally filed specificaiton p. 11 from U.S. Patent 6,067,125 published May 23, 2000.*

* cited by examiner

*Primary Examiner* — Nicholas Giles
(74) *Attorney, Agent, or Firm* — Lee & Morse, P.C.

(57) ABSTRACT

An image restoration method includes receiving an externally input image signal, generating a filtered image signal by filtering the input image signal, and generating a restored image signal by calculating a weighted average of the input image signal and the filtered image signal. Such a method may be implemented using an image restoration device including an image filtering unit adapted generated the filtered image signal, and an image mixing unit adapted to generate the restored image signal. More particularly, the restored image signal may be generated using weighting factors calculated based on the input image signal, by calculating a local variance of pixels in the input image signal, and calculating the weighting factor for each of the pixels based on the local variance of each of the pixels.

13 Claims, 5 Drawing Sheets

FIG. 10

IMAGE RESTORATION DEVICES ADAPTED TO REMOVE ARTIFACTS FROM A RESTORED IMAGE AND ASSOCIATED IMAGE RESTORATION METHODS

BACKGROUND

1. Field

Embodiments relate to an image restoration device and an image restoration method. More particularly, embodiments to an image restoration device and an image restoration method for generating a restored image by taking a weighted average of an observed image and a filtered image based on a weighting factor.

2. Description of the Related Art

Although digital image restoration may remove degradation factors together with a certain amount of noise, undesired artifacts still remain in a restored image.

SUMMARY

Embodiments are therefore directed to an image restoration device and an image restoration method, which substantially overcome one or more of the problems due to the limitations and disadvantages of the related art.

It is therefore a feature of an embodiment to provide an image restoration device adapted to remove artifacts from a restored image.

It is therefore a separate feature of an embodiment to provide an image restoration method for removing artifacts from a restored image.

At least one of the above and other features and advantages may be realized by providing an image restoration device adapted to receive an image signal, the device including an image filtering unit adapted to filter the image signal and output the filtered image signal, and an image mixing unit adapted to receive the image signal and the filtered image signal, to calculate a weighted average of the image signal and the filtered image signal, and to output the weighted average as a restored image signal.

The image filtering unit may include a constrained least square (CLS) filter.

The CLS filter may be a finite impulse response (FIR) filter.

The device may further include a weighting factor calculating unit adapted to receive the image signal, to calculate a local variance of pixels in the image signal, to calculate weighting factors for each of the pixels based on the local variance of each of the pixels, and to output the weighting factors to the image mixing unit.

The image mixing unit may be adapted to calculate the weighted average of the image signal and the filtered image signal based on the weighting factors input by the weighting factor calculating unit.

The weighting factor calculating unit may be adapted to calculate the local variance of each of the pixels according to an equation $$v(x, y) = \frac{1}{M} \sum_{(x,y) \in S} (f(x, y) - m_{xy})^2$$

where (x, y) corresponds to a coordinate of the respective pixel, v(x, y) corresponds to the local variance of the respective pixel (x, y), S corresponds to a predetermined region to which the respective pixel (x, y) belongs, M corresponds to a number of pixels which belong to the region S, f(x, y) corresponds to an image value of the respective pixel (x, y), and mxy corresponds to a local mean of the region S.

The weighting factor calculating unit may be adapted to calculate the local mean of the region S according to an equation $$m_{xy} = \frac{1}{M} \sum_{(x,y) \in S} f(x, y).$$

The weighting factor calculating unit may be adapted to calculate the weighting factors of each of the pixels according to an equation $$\alpha(x, y) = \frac{1}{1 + \sigma v(x, y)}$$

where α(x, y) corresponds to a weighting factor of the pixel (x, y), and σ corresponds to a tuning parameter.

The weighting factor calculating unit may include a finite impulse response (FIR) filter.

At least one of the above and other features and advantages may be separately realized by providing an imaging system, including an imaging device adapted to capture an image of an object, to generate an image signal of the captured image, and to output the image signal, and an image signal processing device adapted to receive the image signal from the imaging device, wherein the image signal processing device, includes an image filtering unit adapted to filter the image signal and output the filtered image signal, and an image mixing unit adapted to receive the image signal and the filtered image signal, to calculate a weighted average of the image signal and the filtered image signal, and to output the weighted average as a restored image signal.

At least one of the above and other features and advantages may be separately realized by providing an image restoration method, including receiving an externally input image signal, generating a filtered image signal by filtering the input image signal, and generating a restored image signal by calculating a weighted average of the input image signal and the filtered image signal.

The method may include calculating weighting factors based on the input image signal, wherein calculating the weighting factors may include calculating a local variance of pixels in the input image signal, and calculating the weighting factor for each of the pixels based on the local variance of each of the pixels, wherein generating the restored image signal may include calculating the weighted average of the input image signal and the filtered image signal based on the weighting factors for the pixels.

Calculating the local variance of each of the pixels may include calculating a local mean of a region to which the respective pixel belongs.

Calculating the local mean of the respective region may include calculating the local mean according to an equation $$m_{xy} = \frac{1}{M} \sum_{(x,y) \in S} f(x, y).$$

Calculating the local variance of each of the pixels may include calculating the local variance of each of the pixels according to an equation $$v(x, y) = \frac{1}{M} \sum_{(x,y) \in S} (f(x, y) - m_{xy})^2$$

where ((x, y) corresponds to a coordinate of the respective pixel, v(x, y) corresponds to the local variance of the respective pixel (x, y), S corresponds to a predetermined region to which the respective pixel (x, y) belongs, M corresponds to a number of pixels which belong to the region S, f(x, y) corresponds to an image value of the respective pixel (x, y), and $m_{xy}$ corresponds to a local mean of the region S.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "between" two elements, it can be the only element between the two elements, or one or more intervening elements may also be present. Like reference numerals refer to like elements throughout the specification.

Figure 1:
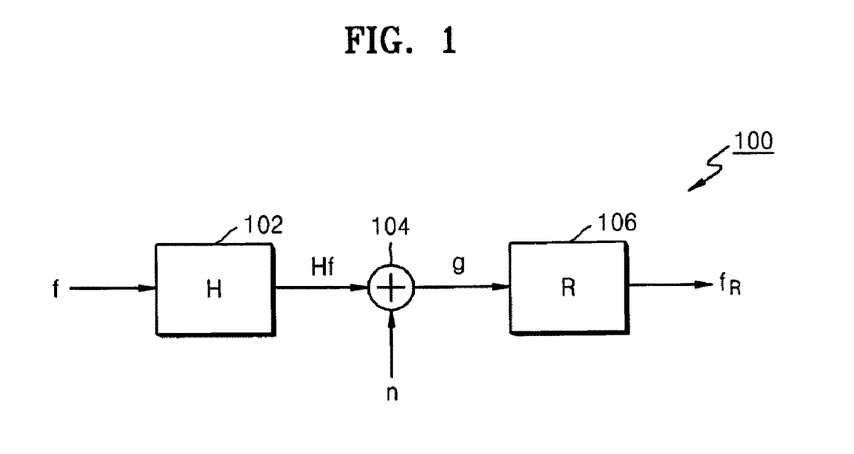
FIG. 1 illustrates a block diagram of a model for describing image degradation process and image restoration process.

FIG. 1 illustrates a block diagram of a model 100 for describing image degradation process and image restoration process. As shown in FIG. 1, the model 100 may include an image degradation unit 102, an adding unit 104, and an image restoration unit 106.

Referring to FIG. 1, the image degradation unit 102 may receive the input of an original image f and may output an image Hf degraded based on point spread function (PSF) H. The PSF refers to a function indicating distribution of light intensity obtained from a surface on which an image is actually formed when a point light passes through an optical system.

The adding unit 104 may output a degraded image g by combining the image Hf output by the image degradation unit 102 and noise n. The adding unit 104 may be a component for modeling a phenomenon in which a noise generated in a sensor, etc., are added to the image Hf output by the image degradation unit 102.

The degraded image g may be expressed as in Equation 1 below.

$g = Hf + n$ [Equation 1]

The image restoration unit 106 may generate a restored image $f_R$ according to Equation 2 below by receiving the input of the degraded image g and performing image restoration based on the PSF H.

$f_R = Rg$ [Equation 2]

In Equation 2, R may indicate a transfer function for modeling the image restoration process of the image restoration unit 106. The transfer function R may be estimated from the PSF H.

Although the image restoration unit 106 may eliminate image degradation by controlling amplification of the noise n, undesired artifacts may still remain in the restored image $f_R$ even after the image restoration. In particular, during restoration of images captured through an extended depth-of-field (EDoF) lens, granular noise in a flat region of degraded images may be amplified and clustered.

Figure 2:
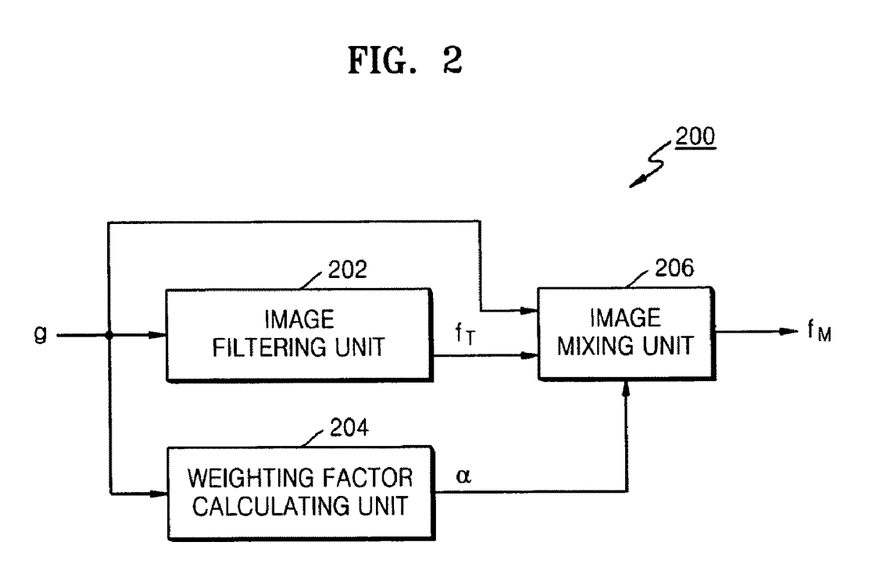
FIG. 2 illustrates a block diagram of an exemplary embodiment of an image restoration device.

FIG. 2 illustrates a block diagram of an exemplary embodiment of an image restoration device 200. The image restoration unit 106 shown in FIG. 1 may include the image restoration device 200.

The image restoration device 200 may generate a restored image signal $f_M$ with respect to a precise and high-frequency region by increasing a composition ratio of an filtered image signal $f_T$ filtered by an image filtering unit 202, and may generate a restored image signal $f_M$ with respect to a flat region by increasing a composition ratio of an input image signal g.

Referring to FIG. 2, the image restoration device 200 may receive an input image signal g, may restore the input image signal g, and may output a restored image signal $f_M$. The image signal g may be externally supplied. The image signal g may be an image signal corresponding to the degraded image g shown in FIG. 1. As shown in FIG. 2, the image restoration device 200 may include the image filtering unit 202, a weighting factor calculating unit 204, and an image mixing unit 206.

The image filtering unit 202 may receive the input of an image signal g, filter the received image signal g, and output a filtered image signal $f_T$. The image filtering unit 202 may perform deconvolution for generation of a restored image $f_T$. The image filtering unit 202 may include a constrained least square (CLS) filter. A truncated constrained least square (TCLS) filter may be used to embody the CLS filter as a finite impulse response (FIR) filter. A TCLS filter may refer to a filter embodied by simply modeling a CLS filter. The technical definitions of the CLS filter and the FIR filter are known to one of ordinary skill in to the art, and thus detailed descriptions thereof will be omitted.

The weighting factor calculating unit 204 may receive the input of an image signal g, may calculate a weighting factor based on the input image signal g, and may output a weighting factor α to the image mixing unit 206. For example, the weighting factor α output by the weighting factor calculating unit 204 may be $0 \leq \alpha \leq 1$.

The image mixing unit 206 may receive the image signal g and the filtered image signal $f_T$, and may calculate the weighted average of the image signal g and the filtered image signal $f_T$ based on the weighting factor α input by the weighting factor calculating unit 204. The image mixing unit 206 may output the weighted average as a restored image signal $f_M$.

A method of mixing an image signal g and a filtered image signal fT based on a weighting factor α in the image mixing unit 206 may be indicated as Equation 3 below.

$$f_M = \alpha g + (1-\alpha) f_T \quad \text{[Equation 3]}$$

As shown in Equation 3, the restored image signal $f_M$ may be obtained based on the weighted average of the image signal g and the filtered image signal $f_T$. Referring to Equation 3, the value of the restored image signal $f_M$ may become closer to the value of the filtered image signal $f_T$ as the value of the weighting factor α is closer to 0, whereas the value of the restored image signal $f_M$ may become closer to the value of an image signal g as the value of the weighting factor α is closer to 1. Therefore, composition ratios of the image signal g and the filtered image signal $f_T$ may be determined based on the weighting factor α.

As described above, the weighting factor α may be calculated by the weighting factor calculating unit 204 and may be output to the image mixing unit 206. Hereinafter, the process of calculating a weighting factor α will be described in more detail.

The weighting factor calculating unit 204 may calculate local variances of each pixel included in an input image signal g. The local variances may be obtained by calculating variances of an image value of pixels with respect to pixels included in one or more portions of the image signal g according to Equation 4 below. In embodiments, the local variances may only be calculated with respect to pixels included in the respective one or more portions of the image signal g, and need not be calculated with respect to all the pixels of the image signal.

$$v(x, y) = \frac{1}{M} \sum_{(x,y) \in S} (f(x, y) - m_{xy})^2 \quad \text{[Equation 4]}$$

In Equation 4, (x, y) refers to coordinates of a pixel, and v(x, y) refers to the local variance of the pixel (x, y). The term 'pixel (x, y)' refers to a pixel corresponding to a coordinate (x, y).

In Equation 4, S refers to a predetermined region to which the pixel (x, y) belongs, and M refers to a number of pixels which belong to the region S. For example, a region S may be a square-shaped region including 5×5 pixels, where the pixel (x, y) is located at the center of the region S. In this case, a number M of pixels included in the region S may be 25. It should be understood that the size and the shape of the region S are not limited to the example set forth above, and various modifications may be made therein according to an image signal g.

In Equation 4, f(x, y) refers to the image value of the pixel (x, y). Here, the image value of the pixel (x, y) may be a red (R) value, a green (G) value, or a blue (B) value of the pixel (x, y). For example, in case that R, G and B signals are each designated with 6 bits, the image value of the pixel (x, y) may be greater than or equal to 0 and less than or equal to 63.

In Equation 4, $m_{xy}$ refers to the local mean of a region S. The local mean may be obtained by calculating the mean of image values of pixels with respect to pixels included in one or more portions of the image signal g according to Equation 5 below. In embodiments, the mean may only be calculated with respect to pixels included in the one or more respective portions of the image signal g, and need not be calculated with respect to all the pixels of the image signal g.

$$m_{xy} = \frac{1}{M} \sum_{(x,y) \in S} f(x, y) \quad \text{[Equation 5]}$$

As described above, the weighting factor calculating unit 204 may calculate the local variance v(x, y) of a region S to which the pixel (x, y) belongs by calculating the local mean $m_{xy}$ of the region S.

The weighting factor calculating unit 204 may calculate a weighting factor α according to Equation 6 below by using the local variance v(x, y) calculated according to Equation 4 above.

$$\alpha(x, y) = \frac{1}{1 + \sigma v(x, y)} \quad \text{[Equation 6]}$$

In Equation 6, α(x, y) refers to the weighting factor of the pixel (x, y), and σ refers to a tuning parameter. The value of the tuning parameter σ may be determined such that the weighting factor α is uniformly distributed between 0 and 1. For example, when the value of pixel intensity is normalized between 0 and 1, a typical value of the tuning parameter σ may be 1000. The value of the tuning parameter σ may vary.

As described above, the weighting factor calculating unit 204 may calculate the weighting factor α according to Equation 6 and output the weighting factor α to the image mixing unit 206. The image mixing unit 206 may receive the input image signal g, the filtered image signal $f_T$, and the weighting factor α. The image mixing unit 206 may calculate the weighted average of the image signal g and the filtered image signal $f_T$ based on the weighting factor α, and may output the weighted average as a restored image signal $f_M$.

Both the image filtering unit 202 and the weighting factor calculating unit 204 may have a FIR structure. Thus, a filtered image signal $f_T$ and a weighting factor α may be generated and output in real-time. Therefore, embodiments of the image restoration device 200 may restore the image signal g and output a restored image signal $f_M$ in real-time.

Figure 3:
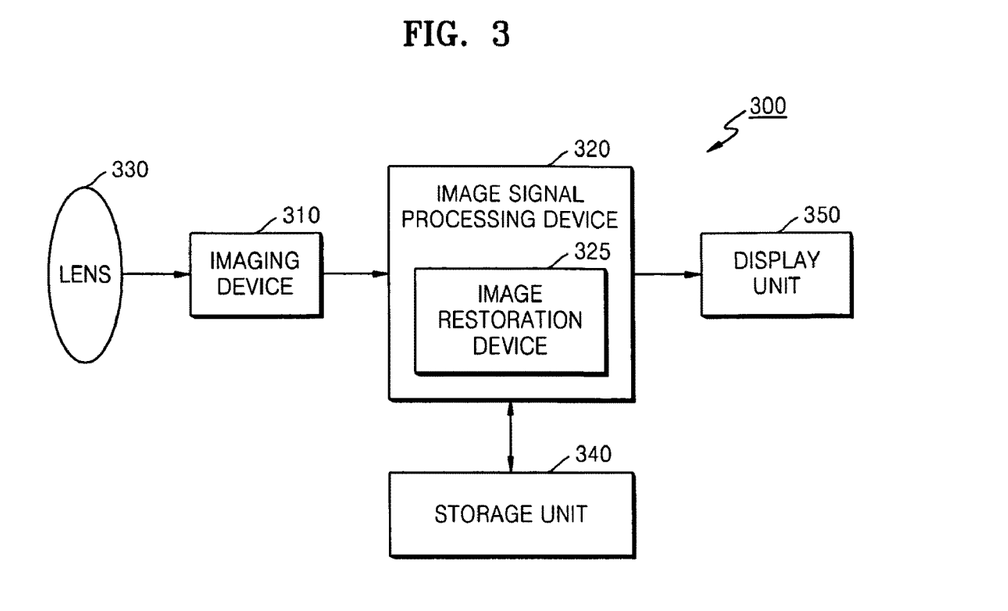
FIG. 3 illustrates a block diagram of an exemplary embodiment of an imaging system.

FIG. 3 illustrates a block diagram of an imaging system 300 according to an embodiment. Referring to FIG. 3, the imaging system 300 may include an imaging device 310 and an image signal processing device 320. Furthermore, the imaging system 300 may further include a lens 330, a storage unit 340, and a display unit 350.

Referring to FIG. 3, the imaging device 310 may capture an image of an object (not shown), generate image signals of the captured image, and output the generated image signals to the image signal processing device 320.

The imaging device 310 may be embodied as a complementary metal-oxide semiconductor (CMOS) image sensor (CIS), a charge-coupled device (CCD), etc. The pixel array of the imaging device 310 may be, e.g., an active pixel sensor (APS) array in which a million or more pixels are arranged. The imaging device 310 may generate image signals including R, G, and B by capturing an image of an object (not shown) using photodiodes included in each of pixels of the APS array. Three types of color filters, e.g., R, G, B, may be arranged, e.g., in the form of a Bayer pattern, on the top of each of pixels constituting the APS array, so that light of predetermined colors may be incident thereto. In such cases, image signals output by the imaging device 310 may have a Bayer pattern.

The image signal processing device 320 shown in FIG. 3 may be a general image signal processor (ISP). As shown in FIG. 3, the image signal processing device 320 may include an image restoration device 325. In embodiments, the image restoration device 325 may include one or more features described above with respect to the image restoration device 200 of FIG. 2. More particularly, the image restoration device 200 of FIG. 2 may be employed as the image restoration device 325 of FIG. 3.

As described above, the image restoration device 325 may restore an image signal input by the imaging device 310 and output a restored image signal. The image signal processing device 320 may process the restored image signal restored by the image restoration device 325 and output a processed image signal. Operations processed by the image signal processing device 320 may include at least one of an interpolation process, a gamma correction process, an edge enhancement process, an auto exposure (AE) control, an auto white balance (AWB) control, and digital zoom.

The lens 330 may be arranged between an object (not shown) and the imaging device 310. The lens 330 may refract an image of the object transmitted to the imaging device 310. In some embodiments, the lens 330 of the imaging system 300 may be an EDoF lens.

The storage unit 340 may receive an image signal output by the image signal processing device 320 and may store the received image signal. The image signal output by the image signal processing device 320 may be compressed in a format, such as the joint photographic expert group (JPEG) or the motion picture experts group (MPEG) before being stored in the storage unit 340. The storage unit 340 of the imaging system 300 may be, e.g., a general memory device, such as a dynamic random access memory (DRAM), a flash memory, etc.

The display unit 350 may receive the image signal output by the image signal processing device 320 and may display the image signal on a screen. An image signal output by the image signal processing device 320 may be output to the display unit 350 after resolution conversion. The display unit 350 of the imaging system 300 may be a general display device, e.g., a liquid crystal display (LCD).

An imaging system employing one or more aspects described herein, e.g., the imaging system 300 FIG. 3, may be included, e.g., in a camera module for a mobile phone camera, a digital still camera, etc.

Figure 4:
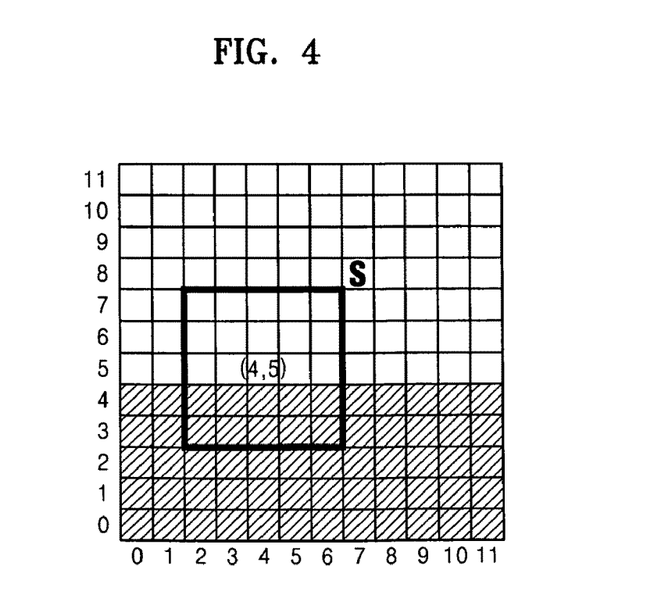
FIGS. 4 and 5 illustrate diagrams of exemplary image signals input to the image restoration device of FIG. 2.
Figure 5:
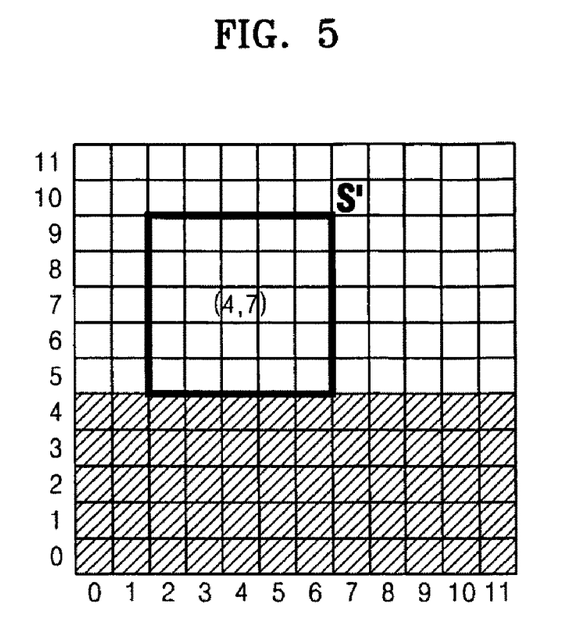

FIGS. 4 and 5 illustrate diagrams of exemplary image signals input to the image restoration device 200 of FIG. 2. More particularly, operations of the weighting factor calculating unit 204 of the image restoration device 200 will be described in more detail below with reference to FIGS. 4 and 5.

As described above, the weighting factor calculating unit 204 may calculate the local variance v(x, y) of a region S to which a pixel (x, y) belongs by calculating the local mean $m_{xy}$ of the region S, and may calculate a weighting factor α using the calculated local variance v(x, y).

Referring to FIG. 4, each of the squares shown in FIG. 4 may correspond to a pixel, and the number scale along the bottom portion and left portion of FIG. 4 indicate an x-coordinate and a y-coordinate of a pixel, respectively. In the exemplary embodiment of FIG. 4, a region S is a square region including 5×5 pixels, and the pixel located at the center of the region S is the pixel (4, 5).

If the pixel located at the center of the region S is defined as the pixel corresponding to the region S, the pixel corresponding to the region S in FIG. 4 may be the pixel (4, 5).

Further, in FIG. 4, if it is assumed that the image value of each of shaded pixels is 10 and the image value of each of unshaded pixels is 0, the weighting factor α of the pixel (4, 5) may be calculated as described below.

Referring to Equation 5 above, a local mean $m_{45}$ of the pixel (4, 5) may be calculated according to Equation 7 below. In the exemplary image of FIG. 4, since the region S is a square region including 5×5 pixels, a number M of pixels included in the region S is 25.

$$m_{45} = \frac{1}{M} \sum_{(x,y) \in S} f(x, y) \qquad \text{[Equation 7]}$$
$$= \frac{1}{25}(0 \times 15 + 10 \times 10)$$
$$= 4$$

Therefore, the local mean $m_{45}$ of the pixel (4, 5) is 4.

Next, referring to Equation 4 above, a local variance v(4, 5) of the pixel (4, 5) may be calculated according to Equation 8 below.

$$v(4, 5) = \frac{1}{M} \sum_{(x,y) \in S} (f(x, y) - m_{xy})^2 \qquad \text{[Equation 8]}$$
$$= \frac{1}{25}((0 - 4)^2 \times 15 + (10 - 4)^2 \times 10)$$
$$= 24$$

Therefore, the local variance v(4, 5) of the pixel (4, 5) is 24.

Based on the results of calculations above, a weighting factor α(4, 5) of the pixel (4, 5) may be calculated according to Equation 9 below. Here, it is assumed that the tuning parameter σ is 1.

$$\alpha(4, 5) = \frac{1}{1 + \sigma v(4, 5)} \qquad \text{[Equation 9]}$$
$$= 0.04$$

Therefore, the weighting factor α(4, 5) of the pixel (4, 5) of the image signal shown in FIG. 4 is 0.04.

In the same regard, it would be apparent to one of ordinary skill in the art that, when the weighting factor α(4, 7) of a pixel (4, 7) illustrated in FIG. 5 is calculated, a weighting factor α(4, 7) of the pixel (4, 7) is 1, because the local variance v(4, 7) of the pixel (4, 7) is 0.

More particularly, the region S of FIG. 4 corresponds to an edge region such that the pixel (4, 5) is a pixel belonging to a region in which image values of the pixels may vary significantly, e.g., an edge region. Referring to FIG. 5, a region S' corresponds to a flat region such that the pixel (4, 7) is a pixel belonging to a region in which image values of the pixels may barely vary, if at all, e.g., a flat region. In an image signal g, pixels belonging to an edge region, in which image values of the pixels may vary significantly, may have weighting factors α close to 0, whereas pixels belonging to a flat region, in which image values of the pixels may barely vary, if at all, may have weighting factors α close to 1.

Therefore, referring to Equation 3, embodiments of an image restoration devices, e.g., the image restoration device 200, 325 of FIGS. 2, 3, may generate a restored image signal $f_M$ with respect to a precise and high-frequency region, such as an edge region, by increasing a composition ratio of an filtered image signal $f_T$ filtered by a image filtering unit 202, and may generate a restored image signal $f_M$ with respect to a flat region by increasing a composition ratio of an input image signal g.

Figure 6:
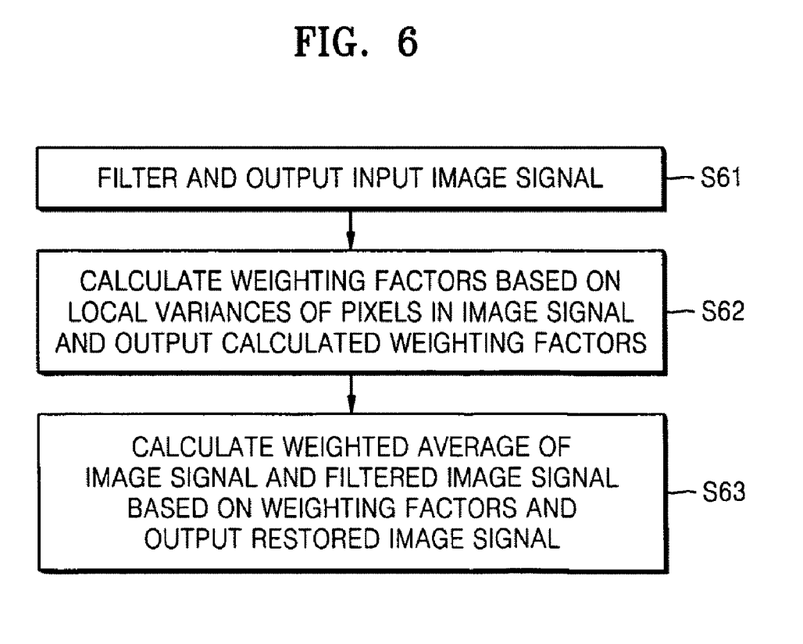
FIG. 6 illustrates a flowchart of an exemplary embodiment of an image restoration method.

FIG. 6 illustrates a flowchart of an exemplary embodiment of an image restoration method. Referring to FIG. 6, when the image restoration method is initiated and an image signal is input, the method may include filtering the input image signal and outputting a filtered image signal (operation S61), calculating and outputting weighting factors based on local variances of pixels included in the input image signal (operation S62), and calculating a weighted average of the input image signal and the filtered image signal and outputting a restored image signal based on the calculated weighted average (operation S63). Since descriptions of the image restoration method are similar to the descriptions of the image restoration device given above in reference to FIGS. 2 through 5, detailed description of the image restoration method will not be repeated.

FIGS. 7 through 10 illustrate exemplary images for describing the image restoration process described above with reference to FIG. 6. The image restoration process may be implemented using an image restoration device, e.g., the image restoration device 200, 325 of FIGS. 2, 3, respectively.

Figure 7:
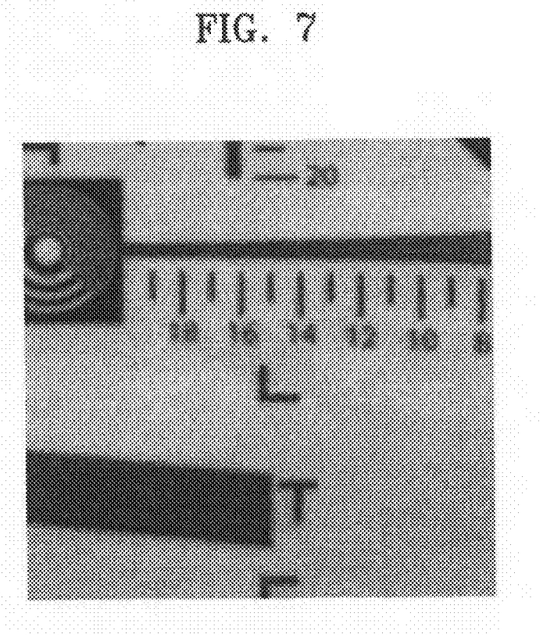
FIG. 7 illustrates a diagram of an exemplary image that may be input to the image restoration device of FIG. 2.
Figure 8:
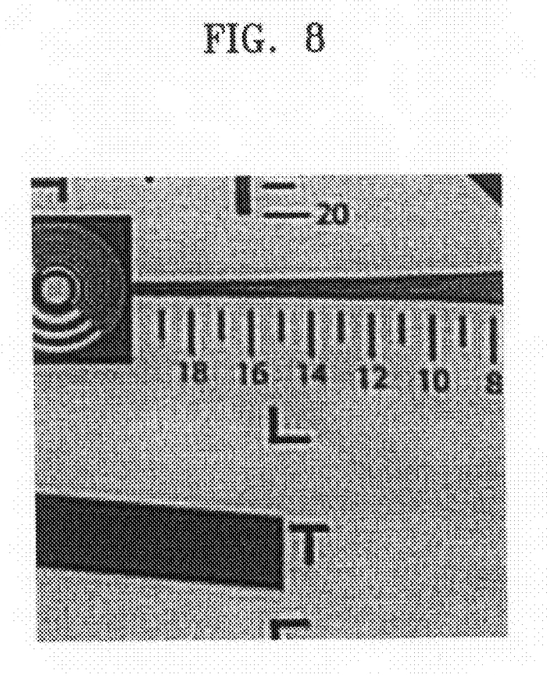
FIG. 8 illustrates a diagram showing the image shown in FIG. 7 after being filtered by the image filtering unit of FIG. 2.

FIG. 7 illustrates a diagram of an exemplary image that may be input to the image restoration device of FIG. 2. FIG. 8 illustrates a diagram showing the image shown in FIG. 7 after being filtered by the image filtering unit 202 of FIG. 2.

More particularly, e.g., the image shown in FIG. 7 may be an image corresponding to the image signal g shown in FIG. 2. The image shown in FIG. 7 is an unfocused image prior to image restoration.

The image shown in FIG. 8 may be an image corresponding to the image signal $f_T$ filtered by the image filtering unit 202 as shown in FIG. 2. Referring to FIG. 8, granular noise in the flat region are amplified in the image shown in FIG. 8 as compared to the image shown in FIG. 7.

Figure 9:
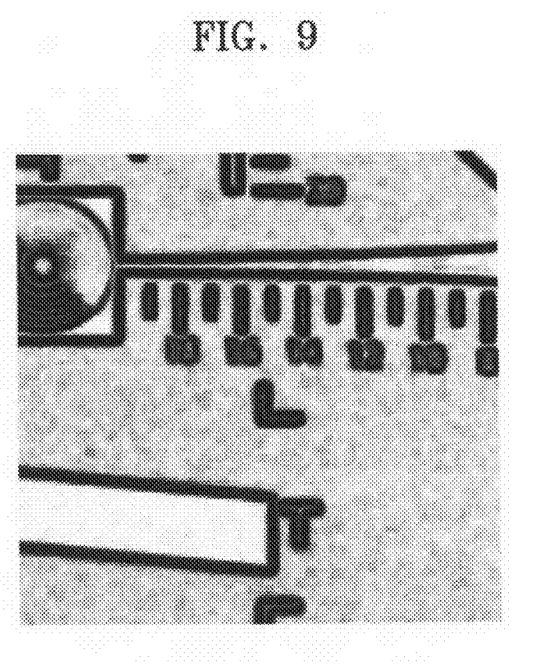
FIG. 9 illustrates a diagram of an alpha map of the image shown in FIG. 7.

FIG. 9 illustrates a diagram of an alpha map of the image shown in FIG. 7. The alpha map is an image displayed based on replaced image values, where the replaced image values are obtained by replacing weighting factors α of each of pixels calculated by the weighting factor calculating unit 204 with corresponding image values. Referring to FIG. 9, with regard to an edge region, in which image values of the pixels may vary significantly and may have weighting factors α close to 0, the edge region may be shown as a dark region. Referring still to FIG. 9, since a flat region, in which image values of the pixels may barely vary, if at all, and may have weighting factors α close to 1, the flat region correspond may be shown as a bright region.

Figure 10:
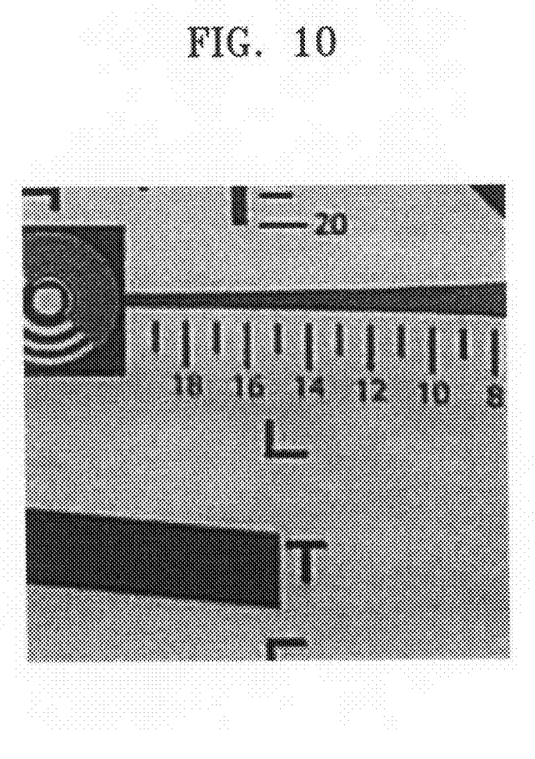
FIG. 10 illustrates a diagram of an image restored from the input image shown in FIG. 7 by the image restoration device of FIG. 2.

FIG. 10 illustrates a diagram of an image restored from the input image shown in FIG. 7 using, e.g., the image restoration device 200 of FIG. 2.

More particularly, the image shown in FIG. 10 may be an image corresponding to the image signal $f_M$ restored by the image mixing unit 206 as shown in FIG. 2. In the image shown in FIG. 10, the region corresponding to an edge region is shown as clear as in the image of FIG. 8, whereas granular noise in the flat region is remarkably reduced as compared to the image shown in FIG. 8.

In other words, an image restored according to embodiments of an image restoration method and/or an image restoration device including one or more features described above, e.g., the exemplary method of FIG. 6, the image restoration device 200, 325, may retain clarity of an edge region and may obtain a smooth flat region.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An image restoration device adapted to receive an image signal, the device comprising:
an image filtering unit adapted to filter the image signal and output the filtered image signal;
an image mixing unit adapted to receive the image signal and the filtered image signal, to calculate a weighted average of the image signal and the filtered image signal, and to output the weighted average as a restored image signal; and
a weighting factor calculating unit, the weighting factor calculating unit being adapted to receive the image signal, to calculate a local variance of pixels in the image signal, to calculate weighting factors for each of the pixels based on the local variance of each of the pixels, and to output the weighting factors to the image mixing unit,
wherein the weighting factor calculating unit is adapted to calculate the local variance of each of the pixels according to an equation $$v(x, y) = \frac{1}{M} \sum_{(x,y) \in S} (f(x, y) - m_{xy})^2$$

where (x, y) corresponds to a coordinate of the respective pixel, v(x, y) corresponds to the local variance of the respective pixel (x, y), S corresponds to a predetermined region to which the respective pixel (x, y) belongs, M corresponds to a number of pixels which belong to the region S, f(x, y) corresponds to an image value of the respective pixel (x, y), and $m_{xy}$ corresponds to a local mean of the region S.

2. The image restoration device as claimed in claim 1, wherein the image filtering unit includes a constrained least square (CLS) filter.

3. The image restoration device as claimed in claim 2, wherein the CLS filter is a finite impulse response (FIR) filter.

4. The image restoration device as claimed in claim 1, claim 1, wherein the image mixing unit is adapted to calculate the weighted average of the image signal and the filtered image signal based on the weighting factors input by the weighting factor calculating unit.

5. The image restoration device as claimed in claim 1, wherein the weighting factor calculating unit is adapted to calculate the local mean of the region S according to an equation $$m_{xy} = \frac{1}{M} \sum_{(x,y) \in S} f(x, y).$$

6. The image restoration device as claimed in claim 1, wherein the weighting factor calculating unit is adapted to calculate the weighting factors of each of the pixels according to an equation $$\alpha(x, y) = \frac{1}{1 + \sigma v(x, y)}$$

where α(x, y) corresponds to a weighting factor of the pixel (x, y), and σ corresponds to a tuning parameter.

7. The image restoration device as claimed in claim 1, wherein the weighting factor calculating unit includes a finite impulse response (FIR) filter.

8. The image restoration device as claimed in claim 1, wherein the image mixing unit calculates the weighted average of the image signal and the filtered image signal by increasing a composition ratio of the filtered image signal in an edge region in which image values vary significantly and by increasing a composition ratio of the image signal in a flat region in which image values barely vary.

9. An imaging system, comprising:
an imaging device adapted to capture an image of an object, to generate an image signal of the captured image, and to output the image signal; and
an image signal processing device adapted to receive the image signal from the imaging device, the image signal processing device including:
an image filtering unit adapted to filter the image signal and output the filtered image signal;
an image mixing unit adapted to receive the image signal and the filtered image signal, to calculate a weighted average of the image signal and the filtered image signal, and to output the weighted average as a restored image signal, and
a weighting factor calculating unit, the weighting factor calculating unit being adapted to receive the image signal, to calculate a local variance of pixels in the image signal, to calculate weighting factors for each of the pixels based on the local variance of each of the pixels, and to output the weighting factors to the image mixing unit,
wherein the weighting factor calculating unit is adapted to calculate the local variance of each of the pixels according to an equation $$v(x, y) = \frac{1}{M} \sum_{(x,y) \in S} (f(x, y) - m_{xy})^2$$

where (x, y) corresponds to a coordinate of the respective pixel, v(x, y) corresponds to the local variance of the respective pixel (x, y), S corresponds to a predetermined region to which the respective pixel (x, y) belongs, M corresponds to a number of pixels which belong to the region S, f(x, y) corresponds to an image value of the respective pixel (x, y), and $m_{xy}$ corresponds to a local mean of the region S.

10. The imaging system as claimed in claim 9, wherein the image mixing unit calculates the weighted average of the image signal and the filtered image signal by increasing a composition ratio of the filtered image signal in an edge region in which image values vary significantly and by increasing a composition ratio of the image signal in a flat region in which image values barely vary.

11. An image restoration method, comprising:
receiving an externally input image signal;
generating a filtered image signal by filtering the input image signal;
generating a restored image signal by calculating a weighted average of the input image signal and the filtered image signal, and
calculating weighting factors based on the input image signal, the calculating the weighting factors including calculating a local variance of pixels in the input image signal, and calculating the weighting factor for each of the pixels based on the local variance of each of the pixels, wherein:
generating the restored image signal includes calculating the weighted average of the input image signal and the filtered image signal based on the weighting factors for the pixels
calculating the local variance of each of the pixels includes calculating a local mean of a region to which the respective pixel belongs, and
calculating the local mean of the respective region includes calculating the local mean according to an equation $$m_{xy} = \frac{1}{M} \sum_{(x,y) \in S} f(x, y)$$

where (x, y) corresponds to a coordinate of the respective pixel, S corresponds to a predetermined region to which the respective pixel (x, y) belongs, M corresponds to a number of pixels which belong to the region S, f(x, y) corresponds to an image value of the respective pixel (x, y), and $m_{xy}$ corresponds to a local mean of the region S.

12. The method as claimed in claim 11, wherein the weighted average is calculated by increasing a composition ratio of the filtered image signal in an edge region in which image values vary significantly and by increasing a composition ratio of the image signal in a flat region in which image values barely vary.

13. An image restoration method, comprising:
receiving an externally input image signal;
generating a filtered image signal by filtering the input image signal;
generating a restored image signal by calculating a weighted average of the input image signal and the filtered image signal; and
calculating weighting factors based on the input image signal, calculating the weighting factors including calculating a local variance of pixels in the input image signal, and calculating the weighting factor for each of the pixels based on the local variance of each of the pixels, wherein:
generating the restored image signal includes calculating the weighted average of the input image signal and the filtered image signal based on the weighting factors for the pixels, and
calculating the local variance of each of the pixels includes calculating the local variance of each of the pixels according to an equation $$v(x, y) = \frac{1}{M} \sum_{(x,y) \in S} (f(x, y) - m_{xy})^2$$

where (x, y) corresponds to a coordinate of the respective pixel, v(x, y) corresponds to the local variance of the respective pixel (x, y), S corresponds to a predetermined region to which the respective pixel (x, y) belongs, M corresponds to a number of pixels which belong to the region S, f(x, y) corresponds to an image value of the respective pixel (x, y), and $m_{xy}$ corresponds to a local mean of the region S.

* * * * *